J. GUY.
MOP.
APPLICATION FILED MAR. 18, 1919.

1,325,636.

Patented Dec. 23, 1919.

James Guy
Inventor,

By C. A. Snow & Co.
Attorneys.

Witness
F. B. Worden.

UNITED STATES PATENT OFFICE.

JAMES GUY, OF KANSAS CITY, MISSOURI.

MOP.

1,325,636.  Specification of Letters Patent.  Patented Dec. 23, 1919.

Application filed March 18, 1919. Serial No. 283,302.

*To all whom it may concern:*

Be it known that I, JAMES GUY, a citizen of the United States, residing at Kansas City, in the county of Jackson and State of Missouri, have invented a new and useful Mop, of which the following is a specificaton.

The device forming the subject matter of this application is a mop, and the invention aims to provide a simple retainer whereby the head of the mop will be held securely in the handle in a novel manner.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed changes in the precise emobdiment of the invention shown can be made without departing from the spirit of the invention.

In the accompanying drawings:—

Figure 1:
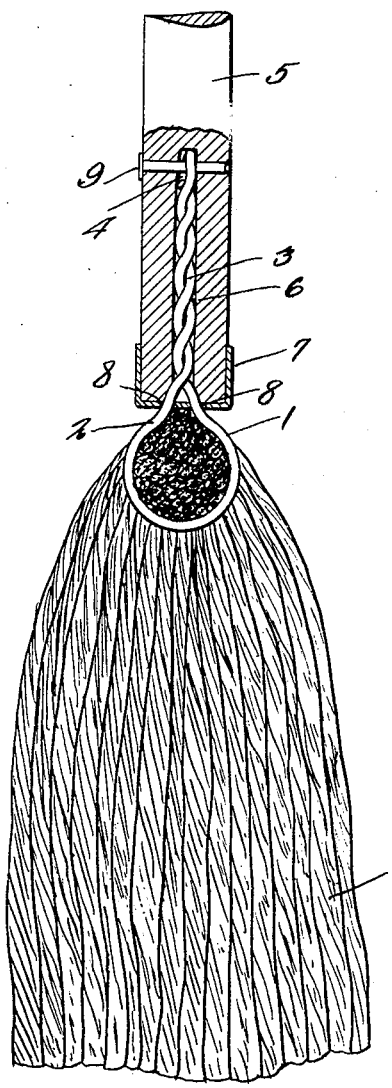
Figure 2:
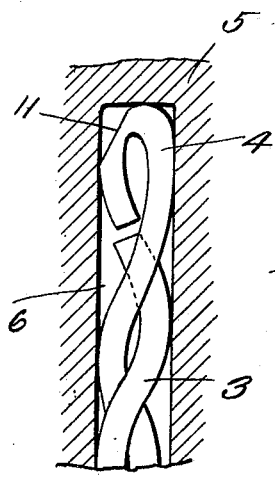
Figure 3:
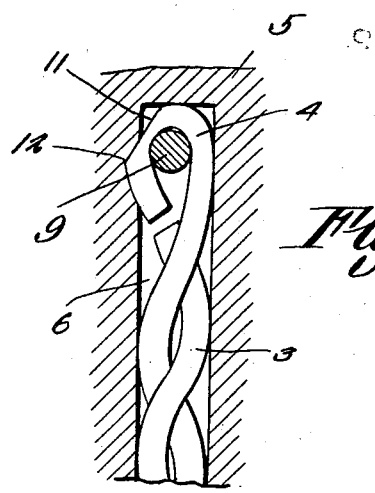

Figure 1 shows in longitudinal section, a mop constructed in accordance with the invention, parts appearing in elevation; and Figs. 2 and 3 are sectional views illustrating the coöperation between the shank of the retainer and handle.

In carrying out the invention there is provided a retainer, preferably fashioned from a single strip of wire bent upon itself to form an eye 1 and converging arms 2, the arms being twisted together to form a shank 3, one arm terminating in a hook 4 located at the end of the shank. The numeral 5 denotes a handle having a socket 6 in its end. The shank 3 is inserted into the socket 6, and a securing device 9, such as a nail or pin, is inserted through the handle 5 transversely, and through the eye 1, thereby to hold the shank 3 in the socket 6. A head 10 is retained in the eye 1.

Since the shank 3 is of twisted form, that part of the structure will possess great strength and the retainer being made of a single piece of material, may be fashioned at trifling expense, the securing device 9 serving to hold the parts assembled.

If desired, a cap 7 may be mounted on the end of the handle 5, the cap having spaced openings 8 through which the arms 2 of the retainer pass, the arms being twisted to form the shank 3, after the arms have been passed through the openings in the cap, the retainer and the cap being held together as an article of manufacture.

It is to be observed that, as indicated at 11, a portion of the hook 4 is cut away adjacent the turn of the hook, to facilitate an opening of the hook when the securing device 9 is inserted thereinto, and to define a pronounced angle 12 which is embedded in the handle 5, within the socket 6, when the securing device expands or opens the hook. This feature aids in retaining the shank 3 in the socket 6.

Having thus described the invention, what is claimed is:—

1. A mop comprising a retainer fashioned from a single strip bent upon itself to form an eye and arms, the arms being twisted together to define a shank, one arm terminating in a free-ended hook located at the end of the shank; a head held in the eye; a handle having a socket whereinto the shank is inserted; and a pin mounted transversely in the handle and extended into the hook, the hook fitting closely in the socket to prevent the hook from opening with respect to the pin.

2. A mop comprising a retainer fashioned from a single strip bent upon itself to form an eye and arms, the arms being twisted together to define a shank, one arm terminating a hook located at the end of the shank; a handle having a socket whereinto the shank is inserted; a securing device in the handle and engaged in the hook, a portion of the hook being cut away adjacent to the turn of the hook to facilitate an opening of the hook when the securing device is inserted thereinto, and to form a pronounced angle which is embedded in the handle when the hook is opened by the securing device; and a head held in the eye.

In testimony that I claim the foregoing as my own, I have hereto affixed my signature in the presence of two witnesses.

JAMES GUY.

Witnesses:
HENRY WOODS,
FRANK WOODS.